US008763697B2

(12) United States Patent
Surguchev et al.

(10) Patent No.: US 8,763,697 B2
(45) Date of Patent: Jul. 1, 2014

(54) PROCESS FOR GENERATING HYDROGEN

(75) Inventors: Leonid Surguchev, Stavanger (NO);
Roman Berenblym, Stavanger (NO);
Anatoly Dmitrievsky, Stavanger (NO)

(73) Assignee: Iris-Forskningsinvest AS, Stavanger (NO)

( * ) Notice: Subject to any disclaimer, the term of this patent is extended or adjusted under 35 U.S.C. 154(b) by 354 days.

(21) Appl. No.: 13/062,684

(22) PCT Filed: Sep. 8, 2009

(86) PCT No.: PCT/GB2009/002155
§ 371 (c)(1),
(2), (4) Date: May 24, 2011

(87) PCT Pub. No.: WO2010/026400
PCT Pub. Date: Mar. 11, 2010

(65) Prior Publication Data
US 2011/0220351 A1 Sep. 15, 2011

(30) Foreign Application Priority Data

Sep. 8, 2008 (GB) .................................. 0816432.9
Oct. 16, 2008 (GB) .................................. 0819008.4

(51) Int. Cl.
*E21B 43/24* (2006.01)
(52) U.S. Cl.
USPC ......... 166/272.1; 166/302; 166/309; 166/371
(58) Field of Classification Search
None
See application file for complete search history.

(56) References Cited

U.S. PATENT DOCUMENTS

| 3,999,607 | A | * | 12/1976 | Pennington et al. .......... 166/259 |
| 4,193,454 | A | | 3/1980 | Goldstein |
| 4,706,751 | A | | 11/1987 | Gondouin |
| 5,145,003 | A | | 9/1992 | Duerksen |
| 2003/0213594 | A1 | | 11/2003 | Wellington et al. |
| 2005/0239661 | A1 | | 10/2005 | Pfefferle |

FOREIGN PATENT DOCUMENTS

| RU | 2064831 C1 | 10/1996 |
| RU | 2116829 C1 | 10/1996 |
| SU | 1204252 A | 1/1986 |
| WO | WO 2008/033268 A1 | 3/2008 |

OTHER PUBLICATIONS

International Search Report and Written Opinion issued for International Application No. PCT/GB2009/002155.
International Preliminary Report on Patentability dated Mar. 1, 2011 for International Application No. PCT/GB2009/002155.

* cited by examiner

*Primary Examiner* — Zakiya W Bates
(74) *Attorney, Agent, or Firm* — Knobbe, Martens, Olson & Bear, LLP

(57) ABSTRACT

A process for the production of hydrogen in a subterranean hydrocarbon reservoir, is provided. The process may comprise the steps of introducing a metal-based catalyst into a hydrocarbon-containing zone in said reservoir, raising the temperature in said zone to a temperature at which catalyzed conversion of hydrocarbon to hydrogen occurs, and, optionally but preferably, recovering hydrogen from an extraction section of a production well located above said zone.

8 Claims, 1 Drawing Sheet

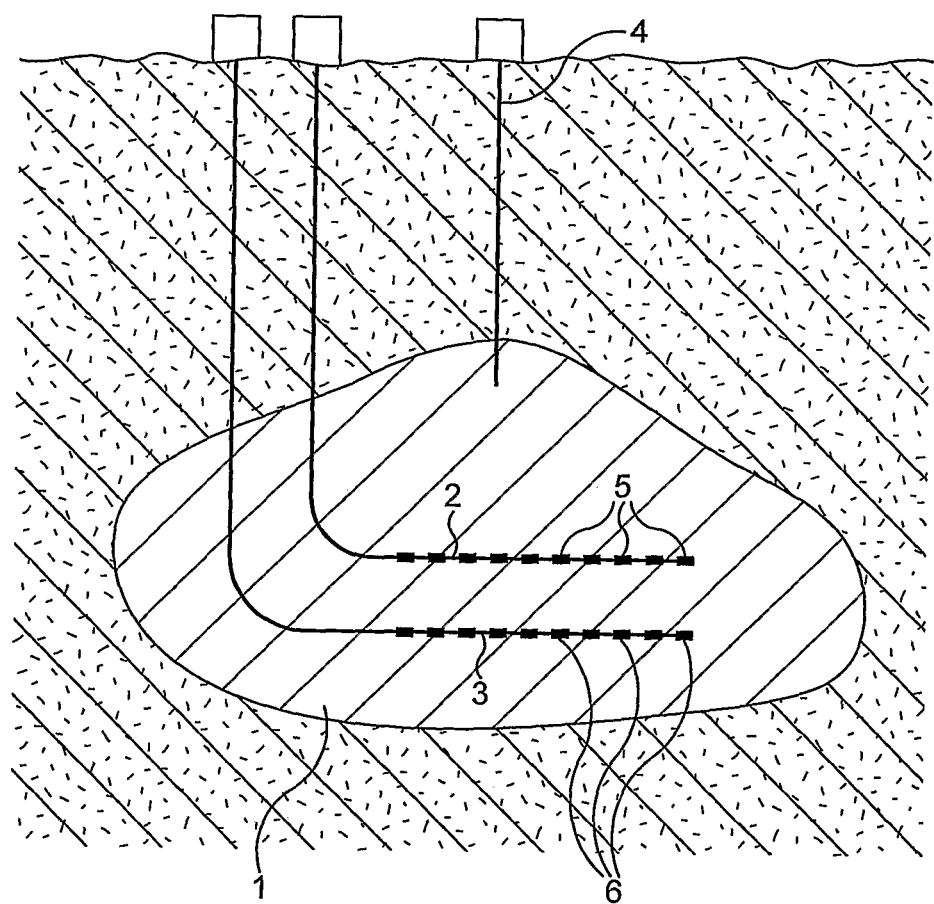

PROCESS FOR GENERATING HYDROGEN

CROSS REFERENCE TO RELATED APPLICATIONS

This application is the U.S. National Phase of International Application No. PCT/GB2009/002155, filed Sep. 8, 2009, designating the U.S. and published as WO 2010/026400 on Mar. 11, 2010 which claims the benefit of British Patent Application No. 0816432.9 filed Sep. 8, 2008 and British Patent Application No. 0819008.4 filed Oct. 16, 2008.

FIELD OF THE INVENTION

Background of the Invention

This invention relates to a process for generating hydrogen in a subterranean hydrocarbon reservoir, e.g. an oil, gas or coal field.

Hydrocarbons, for example gases and oils, retrieved from subterranean reservoirs (e.g. oil wells), are to a large extent used for energy generation by combustion. Such combustion generates carbon dioxide, a "greenhouse gas" which is harmful to the environment if emitted into the atmosphere.

Hydrogen also serves as a useful energy source, for example for fuel cells, and on combustion simply produces water. As a result, much effort has been put into the generation, at the earth's surface, of hydrogen from hydrocarbons. Thus, for example, steam can be reacted with methane to yield carbon monoxide and hydrogen in the endothermic steam reformation reaction

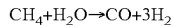

$$CH_4 + H_2O \rightarrow CO + 3H_2$$

The resulting carbon monoxide may further react with steam to produce carbon dioxide and hydrogen in the exothermic gas-shift reaction

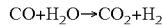

$$CO + H_2O \rightarrow CO_2 + H_2$$

Alternatively, oxygen may be incompletely reacted with methane (or other hydrocarbons) to produce carbon monoxide and hydrogen in the exothermic reaction

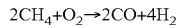

$$2CH_4 + O_2 \rightarrow 2CO + 4H_2$$

The hydrogen produced in this way may be used for combustion or ammonia production, e.g. for fertilizers.

As can be seen, such hydrocarbon reformation nonetheless produces carbon dioxide as a waste product which must be sequestered to prevent environmental damage. Currently some millions of tons of carbon dioxide are sequestered by being injected into subterranean oil reservoirs.

SUMMARY OF INVENTION

We now propose the performance of the hydrogen reforming of hydrocarbons in situ within a subterranean hydrocarbon reservoir. In this way, several beneficial effects are achieved: firstly, hydrogen may be withdrawn from the reservoir; secondly, the resultant carbon dioxide is automatically sequestered; and thirdly, reservoirs which are of low productivity for hydrocarbon gas or oil may have their productivity increased. This in situ production may be achieved by placing a catalyst for the reformation within the reservoir (e.g. within the formation (e.g. rock or other porous medium) or a borehole (well) in the formation) and raising the temperature within the catalyst-carrying zone of the reservoir to a temperature at which reformation occurs. The term "formation" as used herein for convenience means the material from which the reservoir is formed, whether a single medium (e.g. sandstone) or a dual or multiple medium (e.g. carbonates/sandstones/voids, etc), i.e. the material containing the hydrocarbon and possibly also water.

BRIEF DESCRIPTION OF THE SEVERAL VIEWS OF THE DRAWING

FIG. 1 is a schematic diagram of a subterranean hydrocarbon reservoir arranged for performance of the process of the invention.

DETAILED DESCRIPTION OF THE EMBODIMENTS

Thus, viewed from one aspect, the invention provides a process for the production of hydrogen in a subterranean hydrocarbon reservoir, said process comprising the steps of introducing a metal-based catalyst into a hydrocarbon-containing zone in said reservoir; raising the temperature in said zone to a temperature at which catalyzed conversion of hydrocarbon to hydrogen occurs; and, optionally but preferably, recovering hydrogen from an extraction section of a production well located above said zone.

The hydrogen recovery step is stated as being optional since it may be effected long after the hydrogen production step. Without the recovery step, the process of the invention is thus essentially one of transforming a hydrocarbon reservoir into a hydrogen reservoir from which hydrogen can be recovered as and when required.

The metal-based catalyst that is introduced may be a material which is already catalytically active (e.g. a transition metal, preferably a porous or "sponge" metal (for example Raney® nickel), typically nickel, platinum or palladium or a combination thereof, especially nickel), or a material which will transform in situ, for example by thermal decomposition, into a catalytically active material. Many materials are known to be catalytically active for converting hydrocarbons to produce hydrogen and may be used in the process of the invention.

Catalytically active particulates, for example metal or alloy particles, or metals supported on carrier particles, for example silica, alumina or zirconia particles, may be introduced into the reservoir by first fracturing a region of the reservoir around an injection well for example by overpressure or by use of explosives, and then pumping in a dispersion of the particulate in a carrier liquid, for example water or hydrocarbon.

Particularly preferably however, the catalyst is applied in the form of a solution, for example in water or an organic solvent (such as for example a hydrocarbon which itself may be liquid or gaseous at atmospheric pressure), of a metal compound which is decomposable, e.g. thermally decomposable, to form particles of the metal. Examples of such metal compounds include metal carbonyls, alkyls, nitrates, sulphates, carbonates, carboxylates (e.g. formates, acetates, propionates, etc), humic acid salt, and such like. Double complexes, e.g. of palladium or platinum and nickel or zinc may for example be used. Metal humates are known to thermally decompose in the temperature range 100-1000° C. while double salts with oxalate and ammonium are known to thermally decompose in the range 200-400° C. The use of metal compounds which thermally decompose to produce particles of the catalytically active metal at temperatures in the range 150-1000° C., especially 200-700° C., is especially preferred. Where a metal compound solution is applied, this may be a solution of a single metal compound or of two or more compounds of the same or different metals, generally transition metals, especially nickel. The concentrations of the metal compound in the solution will preferably be at or close to saturation.

Thermally degradable metal compounds are described for example in Chhabra et al. J. of Hazardous Materials A99:225-239 (2002); De Jesus et al. Journal of Molecular Catalysis A 228:283-291 (2004); Kuras et al. Catalysis Today 138:55-61 (2008); Shaheen et al. Materials Letters 52:272-28 2(2001); Zadesenets et al. Inorganica Chimica Acta 361:199-207 (2007); XiaoJuan Zhang et al. Materials Letters 62:2343-2346 (2008); and Zhang Le et al. CHIMIE 11:130-136 (2008).

The catalyst will preferably be applied over as large a horizontal distribution as possible, e.g. using a horizontal or near horizontal section of an injection well. Injection may, and preferably will, be at two or more locations within the reservoir so as to create one or more reaction zones. If desired, injection may be at two or more depths so as to create two or more vertically stacked reaction zones, for example so that as the reaction progresses vertically it reaches zones of the reservoir that are pre-seeded with fresh catalyst.

Alternatively, the catalyst may be placed in a well, e.g. by packing a perforated liner in the hole with particulate catalyst or by use of nickel or nickel-coated liners (e.g. with a porosified nickel internal coating). Such catalysts may be activated by heating in a hydrogen atmosphere and may be maintained in an activated state under nitrogen until the thermal front reaches the liners. In general, a temperature sensor will be placed within the bore hole liner at the catalyst "injection" site so as to identify when the local temperature of the reservoir has risen to the level where hydrocarbon-to-hydrogen catalysed conversion will begin, and indeed to identify if and when the combustion front reaches the catalyst "injection" site.

The process of the invention involves raising the temperature of the catalyst-containing zone of the reservoir to a temperature at which hydrogen production occurs, typically at least 250° C., more particularly at least 300° C., especially at least 500° C., more especially at least 600° C., for example 700 to 1100° C. For bituminous reservoirs in particular, a temperature in the range 300 to 400° C., e.g. 320 to 380° C., may be particularly preferred. The catalyst can, and preferably will, be placed in the reservoir before this temperature is reached; however catalyst placement may be effected once the local temperature of the reservoir has risen, for example to increase the local concentration of the catalyst in the reservoir or to provide fresh catalyst. Typically the catalyst will be applied in amounts of at least one tonne calculated on the basis of the catalytic metal. Conveniently, the catalyst can be applied at a concentration of 5 to 400 kg/m$^3$, especially 10 to 200, particularly 50 to 100.

Raising the temperature in the reservoir may be achieved in at least two ways. For shallow reservoirs, particularly onshore (i.e. under land rather than under sea) reservoirs, e.g. at depths of up to 1700 m, the temperature may be raised by injection of superheated water (steam). However, at greater depths, or for example with offshore reservoirs, the temperature loss of the superheated steam on transit to the injection site within the reservoir may be too great. In this event, the temperature within the reservoir can be raised by the injection of oxygen (e.g. as air) and initiation of hydrocarbon combustion within the reservoir. Combustion may be initiated for example by electrical ignition down-hole or self ignition may occur, for example on oxygen injection into a deep, high temperature, light oil reservoir. Where oxygen is introduced in this way, it is preferred, although not essential, to co-introduce water, e.g. as steam.

The introduction of oxygen and/or water may occur at the same sites as catalyst introduction. However, more preferably, oxygen/water introduction is effected at sites below the catalyst introduction site, for example 10 to 500 m below, again preferably at one or more positions along a horizontal or near horizontal bore section. Where oxygen is introduced in this fashion, a high temperature front will pass through the reservoir ahead of the combustion front so causing hydrogen production to occur before the arrival of the combustion front. The high temperature front will activate the catalyst where thermal decomposition of the catalyst material is required and will push catalyst material, steam and produced hydrogen ahead of the combustion front. Hydrogen, being significantly less dense than the carbon oxides, water, and the hydrocarbons, and having significantly smaller molecular size, will separate upwards within the reservoir to accumulate in the crest of the reservoir. Hydrogen can thus be removed from the reservoir through sections of a production well, preferably a well dedicated to hydrogen production, located above the catalyst injection site, for example 20 to 500 m above. The environmentally undesirable "greenhouse gases", such as carbon and nitrogen oxides, being more dense than hydrogen, will segregate downwards within the reservoir under the influence of gravity.

In general, hydrocarbon reservoirs already contain sufficient water for the steam reformation reaction to occur if a catalyst is present and the temperature is raised to the appropriate level. Accordingly, steam injection in the process of the invention is optional rather than essential if temperature raising is to be effected by hydrocarbon combustion.

Oxygen introduction, e.g. air injection, may conveniently be effected at a rate of up to 10 million cubic meters per day, for example 0.5 to 8 m$^3$/day. In this context, cubic meters means volume at standard (atmospheric) pressure and temperature.

Where steam is introduced, this can typically be at rates of 10 to 1000 kL water per day. Desirably, the injection temperature is at least 300° C., especially at least 400° C.; however, where steam rather than combustion is to be used to raise the local temperature within the reservoir, the injection temperature will preferably be at least 600° C., for example up to 1100° C.

Once hydrogen generation has reached the desired level, or once the combustion front has risen to the desired level, the reformation reaction may be shut down by ceasing oxygen/steam injection. If desired, oxygen injection may be terminated before steam injection so as to optimally utilize the heat produced. In any given reservoir, the reformation reaction may be effected in two or more zones so as to optimize hydrogen production.

Where a production well for hydrogen extraction is not already in place, 3D- or 4D-seismic surveying may be used, preferably during the reformation reaction, so as to optimize location of the hydrogen production well. 3D- or 4D-seismic surveying may also be used to optimize placement of the injection wells, for example so as to locate the reaction zone near a gas chimney in the reservoir or beneath a well-defined impervious dome where hydrogen accumulation can occur.

Oxygen injection may also cause some thermal cracking of the hydrocarbons in the reservoir to occur and thus, in viscous heavy oil or depleted reservoirs, hydrocarbon extraction from hydrocarbon production wells may also be enhanced.

The invention is especially suitable for use with depleted and viscous heavy oil hydrocarbon reservoirs. By depleted reservoirs in this context, we include reservoirs which have depleted production due to maturity or water-flooding. Depleted production in this context typically might mean a monthly production level of less than 40%, e.g. less than 10%, of the maximum monthly production level earlier achieved. Without water or gas injection, if the endogenous water content is low, the reservoir may "dry" after no more than about 10% of the original hydrocarbon content has been removed. Even with water or gas injection, reservoirs dry up after about 70% of the hydrocarbon has been removed.

Since the ability of hydrogen, steam and oxygen to pass through the reservoir is greater than that of water or hydrocarbons, the invention is also especially applicable to so-called "tight gas" reservoirs, i.e. reservoirs from which methane extraction is inefficient due to the low permeability of the reservoir formation and difficulties with reservoir pressure maintenance. In the world there are known to be many such reservoirs, containing immense resources of hydrocarbon gas, from which hydrocarbon extraction is not currently economically feasible. Such tight gas reservoirs typically contain dry hydrocarbon gas or hydrocarbon gas and condensate.

The invention is also especially suitable for coal fields containing methane adsorbed in the solid low permeable matrix of coal, or so-called coalbed methane. The methane contained in coal is usually dry with very little intermediate hydrocarbon components content. The predominant transport pathway for methane in coal is by way of fractures, which in coal are in the form of cleats. The effective permeability of coalbeds may vary in the range of 0.1 to 50 milliDarcies. The gas wells in coal fields are usually low rate, often problemed by mobile water production. These wells tend to suffer from rapid production decline due to rapid reservoir pressure depletion and the absence of aquifer pressure support. The resources of coal bed methane are thus normally considered as non conventional, hard to recover with poor project economics. The presence of methane in underground coal mines moreover represents a serious safety risk. In-situ re-forming of coalbed methane to hydrogen using the process of the invention represents a very attractive manner of generating clean energy and extending commercially available energy resources.

Where steam is injected in the process of the invention without oxygen injection, the injection site is preferably at a depth of no more than 1700 m.

Embodiments of the invention will now be described with reference to the accompanying drawing in which FIG. 1 is a schematic diagram of a subterranean hydrocarbon reservoir arranged for performance of the process of the invention.

Referring to FIG. 1 there is shown a subterranean hydrocarbon reservoir 1 having three wells 2, 3 and 4. An aqueous solution of nickel nitrate is injected into the reservoir through injection sites 5 in the horizontal section of injection well 2. Thereafter a water (steam)/air mixture, preferably at at least 300° C., is injected through injection sites 6 in the horizontal section of injection well 3 and hydrocarbon combustion is started by electronic ignition. A thermal front will reach the nickel injection sites and decompose the nickel compound to produce particulate nickel catalyst and initiate hydrocarbon-to-hydrogen conversion. Gravity separation will result in hydrogen rising to the top of the reservoir where it is removed through production well 4. Likewise gravity separation will cause methane to pass into the reaction zone containing the nickel catalyst and carbon dioxide to drop towards the base of the reservoir.

Due to the high reactivity of hydrogen and the desire to exploit the advantages of gravity segregation, the placement of injection and production wells should preferably be designed based on reservoir simulation studies for the specific geological setting.

If the potential consumers of the hydrogen that is produced are remote from the reservoir site, the process can be used to produce a mixture of hydrogen and methane which is cheaper and easier to transport than pure hydrogen. Thus hydrogen may be removed from a site in the reservoir where it is mixed with methane or methane from another production well may be added to the produced hydrogen.

What is claimed is:

1. A process for producing hydrogen in a subterranean hydrocarbon gas reservoir, said process comprising: introducing a metal-based catalyst into a hydrocarbon gas-containing zone in said reservoir; and raising the temperature in said zone to a temperature at which catalyzed conversion of hydrocarbon gas to hydrogen occurs.

2. A process as claimed in claim 1 wherein said catalyst is introduced as a solution of a metal compound thermally decomposable to a catalytically active form.

3. A process as claimed in claim 1 wherein said catalyst is a nickel-based catalyst.

4. A process as claimed in claim 1 wherein said catalyst is injected into the formation surrounding a borehole.

5. A process as claimed in claim 1 wherein the temperature in said zone is raised by injection of an oxygen-containing gas and combustion of endogenous hydrocarbon gas.

6. A process as claimed in claim 1, comprising injecting steam into said reservoir.

7. A process as claimed in claim 1 wherein said reservoir is a tight gas reservoir.

8. A process as claimed in claim 1, wherein the process further comprises recovering hydrogen from an extraction section of a production well located above said zone.

* * * * *